United States Patent Office 2,767,206
Patented Oct. 16, 1956

2,767,206
ALICYCLIC ESTERS OF PHOSPHORIC ACIDS

Richard R. Whetstone, Orinda, and Clayton A. May, Oakland, Calif., assignors to Shell Development Company, New York, N. Y., a corporation of Delaware No Drawing. Application December 30, 1953,
Serial No. 401,414

9 Claims. (Cl. 260—461)

This invention relates to certain novel esters of phosphoric acids and to their sulfur analogs. More particularly, this invention pertains to the bicycloheptenyl esters of dihydrocarbyl phosphoric acids and dihydrocarbyl thiophosphoric acids.

The novel compounds to which this invention pertains may be represented by the following general formula:

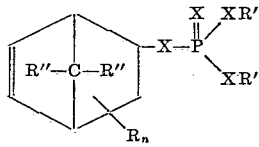

wherein the symbol "R" represents a member of the class consisting of the halogen atoms and the lower alkyl groups and the symbol "$n$" represents a number selected from the class consisting of zero and the integers from 1 through 6. It is preferred that the group or groups designated by the symbol "R" be selected from the chlorine atom and the lower alkyl groups containing not more than about 8 carbon atoms. The symbol "X" represents either an oxygen or a sulfur atom, the symbol "R'" represents an aliphatic essentially hydrocarbon group and the symbol "R''" represents a member of the group consisting of the hydrogen atom and those groups represented by R'. The term "essentially hydrocarbon group" is used to define a class of substituent groups which includes unsubstituted hydrocarbon groups and substituted hydrocarbon groups in which the substituent groups are such, and are substituted in such position, that they are in effect inert and do not alter significantly the basically hydrocarbon character of the hydrocarbon group. Thus included within the meaning of the definition given the symbol "R'" are hydrocarbon groups such as the alkyl and alkenyl groups and their substitution derivatives. It is preferred that the group designated by the symbol "R'" be an unsubstituted lower alkyl group containing not more than about 8 carbon atoms. Examples of this group include the methyl, ethyl, propyl, hexyl and octyl groups. The novel compounds of the invention which have demonstrated the most desirable properties have been those in which the group designated by "R" has been an alkyl group containing from 1 to 4 carbon atoms. Throughout this specification, "R," "R'," "R''" and "X" will retain the meaning just defined.

The novel compounds of the invention may be generically characterized as the bicyclo(2.2.1)-5-hepten-2-yl esters of dihydrocarbyl phosphoric acids, the sulfur analogs of these esters and their halogen- or alkyl-substitution products. From the general formula given, it will be obvious that the essential configuration of the novel compounds is such that a bicyclo(2.2.1)-5-heptenyl radical is attached by a saturated ring carbon atom (and preferably the ring atom at the 2-position of the ring) to the phosphorus atom by an oxygen or sulfur atom.

Examples of these novel compounds are: diethyl bicyclo(2.2.1)-5-hepten-2-yl phosphate, O,O-diethyl S-bicyclo(2.2.1)-5-hepten-2-yl thiothionophosphate (O,O-diethyl S-bicyclo(2.2.1) - 5 - hepten-2-yl phosphorothiothionate), diethyl 1,4,5,6,7,7-hexachlorobicyclo(2.2.1)-5-hepten-2-yl phosphate and diethyl 7,7-dimethyl-bicyclo-(2.2.1)-5-hepten-2-yl phosphate.

It has been found that these new compounds may be prepared by several methods. For example, they may conveniently be prepared by the Diels-Alder addition of a dihydrocarbyl vinyl phosphate with a cyclopentadiene. An example of this reaction comprises the reaction of diethyl vinyl phosphate with hexachlorocyclopentadiene to form diethyl 1,4,5,6,7,7-hexachlorobicyclo(2.2.1)-5-hepten-2-yl phosphate according to the equation:

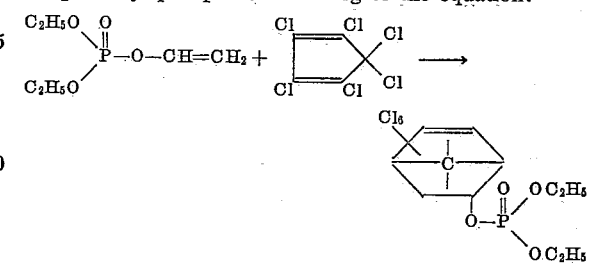

As the cyclodiene reactant there may be used cyclopentadiene itself, or there may be used a substituted cyclopentadiene. Examples of the substituted cyclopentadienes which may be used as the cyclodiene reactant include the halogenated cyclopentadienes, such as mono-, tri-, tetra- and hexachlorocyclopentadiene and the corresponding bromine and iodine-substituted cyclopentadienes, and alkyl-substituted cyclopentadienes, such as 1,1-dimethyl-2,4-cyclopentadiene, 1-propyl-2,4-cyclopentadiene, 1-methyl-2,4-cyclopentadiene, 1-methyl - 1,3 - cyclopentadiene, 2-methyl-1,3-cyclopentadiene, and the like. Of the halogenated cyclopentadienes, the chlorine- and bromine-substituted cyclopentadienes preferably are used, 1,2,3,4,-5,5 - hexachloro - 1,3 - cyclopentadiene, 5,5-dibromo-1,3-cyclopentadiene, 1-chloro-1,3-cyclopentadiene, and 2,3-dibromo-1,3-cyclopentadiene.

As the vinyl phosphate there may be used any dihydrocarbyl vinyl phosphate, the essential requirements for this reaction being the absence of interfering substituent groups on the hydrocarbyl radicals and the presence of the configuration

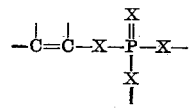

By the term "hydrocarbyl" group, there is meant any monovalent aliphatic essentially hydrocarbon group, such as is represented by the symbol "R'" as this symbol has been previously herein defined. Also useful in this synthesis of the novel compounds are the sulfur analogs of the vinyl phosphates—e. g., compounds in which one or more of the oxygen atoms are replaced by sulfur atoms. For example, such compounds as the di(lower alkyl) vinyl phosphates and di(lower alkyl) thio- or dithiophosphates may be employed, diethyl vinyl phosphate, dibutyl vinyl phosphate, O,O-diethyl S-vinyl thiothionophosphate being examples of this class.

The reaction between the cyclodiene and the dihydrocarbyl vinyl phosphate may be effected by intimately mixing the reactants and slowly heating the mixture to moderately elevated temperatures.

The relative amount of each reactant in the reaction mixture is not critical but in general stoichiometrically equivalent proportions should be used. Thus, about one mole of cyclodiene should be charged per mole of phosphate ester. An excess of the cyclodiene—up to an amount equal to about the weight of phosphate ester charged—may be used if desired to insure complete reaction and to prevent undesirable side reactions in which the phosphate ester reacts with both of the unsaturated carbon-to-carbon linkages of the cyclodiene reactant. A practical range for the proportions of the reactants includes from about 0.5 mole to about 3 moles of the cyclodiene per mole of phosphate ester.

The reaction is effected at moderately elevated temperatures, by which is meant temperatures below about 200° C. While the optimum reaction temperature in a particular case will be determined by the particular reactants, the usual temperature will lie within the range of from about 90° C. to about 170° C.

Although not essential to the production of the desired product in all cases, in some cases it may be found desirable to employ a solvent. For example, a solvent may be added to dissolve a solid reactant or it may be used to give necessary fluidity to the reaction mixture, or to give the bulk to the reaction mixture necessary to accurate temperature control of that mixture, or, in other cases, the solvent may be employed to reduce the concentration of the cyclodiene reactant or the vinyl phosphate ester so that polymerization will not occur. Where a solvent is employed, it should be one that is substantially inert under the reaction conditions. Suitable as the solvent are benzene and its alkyl derivatives, such as xylene and toluene; ethers such as diethyl ether, methyl ethyl ether and the like; ketones such as methyl ethyl ketone, and cyclohexanone and aliphatic and cycloaliphatic hydrocarbons such as the alkanes, hexane and octane and the cycloalkane, cyclohexane.

The desired product may be obtained from the reaction mixture by methods known in the art. For example, the desired product may be obtained by distillation of the reaction mixture at a medium to high vacuum, or may be obtained by selective extraction of the reaction mixture with a suitable solvent.

In addition to the preparation of the novel compounds by a Diels-Alder type of condensation, there may be employed to advantage in many cases a simple addition-type of reaction wherein a dihydrocarbyl phosphoric acid adds to a cycloheptadiene at the double bond. This method is exemplified by the addition of bicyclo (2.2.1)-2,5-heptadiene with O,O-diethyl dithiophosphoric acid (O,O-diethyl hydrogen phosphorodithioate) to form O,O-diethyl S-bicyclo(2.2.1) - 5 - hepten-2-yl-thiothionophosphate (O,O-diethyl S-bicyclo(2.2.1)-5-hepten-2-yl-phosphorothiothionate).

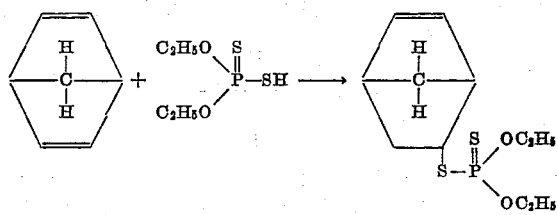

In this reaction, a bicycloheptadiene is reacted with a dihydrocarbyl phosphoric acid ((R'O)₂P(O)(OH)) or a sulfur analog—e. g., a O,O-dihydrocarbyl phosphorothioate—thiophosphoric acid—((R'O)₂P(O)(SH)) or dithioate—dithiophosphoric acid—((R'O)₂P(S)(SH)), in such a way that the phosphoric acid adds to the bicycloheptadiene ring, linking to one of the olefinically unsaturated ring carbon atoms so that the olefinic unsaturation disappears. The reaction may be represented by the net equation

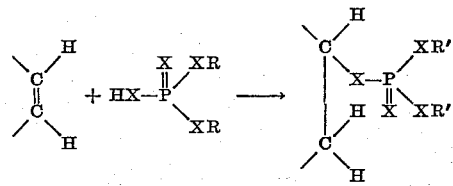

As the diene reactant, there may be used bicyclo-(2.2.1)-2,5-heptadiene itself, or its substitution products such as the polyhalogen-substituted analogs, or its alkyl-substituted analogs. Of these compounds, the chlorine-substituted or the lower alkyl-substituted analogs are preferred. Examples of this class of reactants which may be used to prepare the novel compounds of the invention include 7,7-dimethyl bicyclo(2.2.1)-2,5-heptadiene, 1,4-dimethyl- and 1,4-diethyl bicyclo(2.2.1)-2,5-heptadiene, 1,4-dichlorobicyclo(2.2.1)-2,5-heptadiene, 1,2,3,4-tetra-chlorobicyclo(2.2.1)-2,5-heptadiene and 1,2,3,4,7,7- hexa-chlorobicyclo(2.2.1)-2,5-heptadiene.

As the phosphoric acid reactant there may be used any diester of a phosphoric acid or its sulfur analogs having as ester groups those groups represented by the symbol "R" according to the definition of this symbol heretofore given.

This reaction is effected by mixing together the reactants, a catalyst and, preferably, a polymerization inhibitor and maintaining the mixture at a temperature of from about 35° C. to about 125° C., the optimum temperature generally lying within the range of from about 50° C. to about 85° C. In many cases, it will be found that the reaction is exothermic in character, requiring cooling to maintain the desired temperature. In other cases, slight heating will suffice; in still other cases, moderate heating will be required to effect the reaction at a practical rate.

The reactants are employed in approximately stoichiometric proportions—e. g., one mole of the phosphoric acid per mole of bicycloheptadiene. This limitation is not critical, however, and a larger or smaller amount of the bicycloheptadiene may be employed. It is preferable to use a small excess—perhaps from about 5% to about 100%—of the bicycloheptadiene over the amount theoretically required so as to insure complete reaction, and to suppress any reaction with both double bonds of the cycloheptadiene.

The reaction is catalyzed by an aliphatic tertiary amine, such as, for example, triethylamine, triisopropylamine, tri-n-butylamine, tri-2-ethylhexylamine and the like. The amount of catalyst employed usually lies within the range of from about 0.1% to about 2.0%, based upon the total weight of the reactants charged.

An anti-polymerization agent such as hydroquinone should be employed to guard against polymerization of the bicycloheptadiene.

The desired product may be obtained from the reaction mixture by the usual means known to the art. For example, the reaction mixture may be washed thoroughly with a dilute solution of a base, such as sodium carbonate, to remove any acidic products present, then water washed thoroughly and distilled to remove the desired product. Alternatively, the washed reaction mixture may be steam distilled, or treated with an immiscible solvent in which the desired product is preferentially soluble.

The following examples are given for the purpose of illustrating the novel compounds and the methods by which they may be prepared. It is to be understood that these examples are cited for illustration only, and are not to be considered as restricting the invention in any manner not defined in the claims.

*Example I*

O,O-diethyl S-bicyclo(2.2.1)-5-hepten-2-yl thiothiono-phosphate was prepared by the following procedure: 138 grams (1.5 moles) of bicycloheptadiene, 1 ml. (0.73 gram) of triethylamine and a trace of hydroquinone were mixed and heated to 63° C. The heat was then turned off and 93 grams (0.5 mole) of O,O-diethyl dithiophosphoric acid was added over a 45-minute period. The reaction was exothermic and was held at 75–80° C. by adjusting the rate of addition. 1¼ hours after the addition was completed, the temperature having been held at 65–70° C. during this period, the mixture was allowed to cool, and was diluted with an equal volume of benzene. This mixture was then washed with 250 ml. of a 10% aqueous sodium carbonate solution and was washed four times with water. The product was then stripped under vacuum up to 95° C., giving 133 grams of an orange liquid. Theory for product: 139 grams. This crude product was molecularly distilled, giving 123 grams of a pale yellow liquid, whose refractive index $(20/d) = 1.5390$. The yield thus was 88.5%. The analysis of the product showed: percent carbon: calculated—47.8, found—47.1; percent hydrogen: calculated—6.9, found—6.9; percent sulfur: calculated—23.2, found—23.2; percent phosphorus: calculated—11.2, found—11.2.

*Example II*

To prepare diethyl 1,4,5,6,7,7-hexachlorobicyclo(2.2.1)-5-hepten-2-yl phosphate, a mixture of 81 grams (0.45 mole) of diethyl vinyl phosphate and 123 grams (0.40 mole) of hexachlorocyclopentadiene were heated slowly (during a period of 1¼ hours) to 160° C. and held at that temperature for a period of 16 hours. The mixture was topped to 180° C. at 1 mm. mercury pressure, giving 133 grams as product. Theoretical yield=204 grams. Thus the yield was 65%. Analysis of product: percent chlorine: calculated—50.8, found—46.0; percent carbon: calculated—28.0, found—28.3; percent hydrogen: calculated—2.6, found—3.0.

The novel compounds of the invention have been found to possess insecticidal activity. For example, the compounds prepared in Examples I and II were tested for toxicity against the 2-spotted mite, *Tetranychus bimaculatus*, the common housefly, *Musca domestica*, and the pea aphid, *Illinoia pisi*. In all of these tests, the novel compounds demonstrated a toxicity to these insects which compared quite favorably with the toxicity of known and widely used insecticides. Further, the novel esters of the invention may be hydrogenated and the hydrogenation products used as stabilizers and plasticizers for synthetic resins such as polyvinyl chloride which require plasticization or which, upon exposure to heat or light tend to liberate acidic materials with consequent deterioration in the properties of the resin. The novel esters of the invention or their hydrogenation products also are of value as plasticizers for resins derived from polyhydric phenols or polyhydric alcohols and halogen-substituted epoxide compounds with epichlorohydrin. Representative polyhydric phenols or alcohols for this purpose include 2,2-bis(4-hydroxyphenyl) propane, hydroquinone, catechol, propylene glycol, ethylene glycol, glycerol and the like. The novel esters or their hydrogenation products also can be used as additives for lubricants, such as oils or greases prepared from naturally occurring hydrocarbons, as well as synthetic oils or greases, wherein the novel compounds exert a beneficial stabilizing or neutralizing action, thus aiding in reducing corrosion of the surfaces lubricated, and also enhance the effectiveness of the composition as a lubricant. For example, a minor amount of one or more of the novel esters or their hydrogenation products may be added to an oil or grease, to improve its properties for use under conditions conducive to the formation of corrosive and acidic impurities, as in an internal combustion engine. Lubricants in which the novel esters or their hydrogenation derivatives may be incorporated as additives include, for example, oils or greases derived from petroleum fractions, or synthetic lubricants such as polymerized olefins, polymers and copolymers of alkylene glycols and alkylene oxides, carboxylic acid esters, such as dioctyl sebacate, allyl laurate, and dioctyl phthalate, and esters of phosphoric and phosphonic acids, such as tricresyl phosphate, dioctyl benzenephosphonate, trinonyl phosphate and the like.

We claim as our invention:

1. A compound having the general formula:

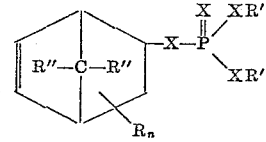

wherein the symbol "R" represents a member of the class consisting of the halogen atoms and the lower alkyl groups, the symbol "*n*" represents a number selected from the class consisting of zero and the integers from 1 through 6, the symbol "X" represents a member of the class consisting of the oxygen and sulfur atoms, the symbol "R'" represents an aliphatic hydrocarbon group and the symbol "R''" represents a member of the group consisting of the hydrogen atom and those groups represented by R'.

2. The compound of claim 1 in which the symbol "R'" represents an alkyl group.

3. A dihydrocarbyl bicyclo(2.2.1)-5-hepten-2-yl phosphate.

4. A O,O-dihydrocarbyl S-bicyclo(2.2.1)-5-hepten-2-yl thiothionophosphate.

5. Diethyl 1,4,5,6,7,7-hexachlorobicyclo(2.2.1)-5-hepten-2-yl phosphate.

6. O,O-diethyl S-bicyclo(2.2.1)-5-hepten-2-yl thiothionophosphate.

7. The process which comprises reacting a dihydrocarbyl diester acid of pentavalent phosphorus with a bicyclo(2.2.1)-2,5-heptadiene in the presence of an aliphatic tertiary amine as catalyst to produce a triester of an acid of pentavalent phosphorus in which two of the esterifying groups are hydrocarbyl groups and the third esterifying group is a bicyclo(2.2.1)-5-hepten-2-yl group.

8. The process which comprises reacting an O,O-dihydrocarbyl dithiophosphoric acid with a bicycloheptadiene in the presence of an aliphatic tertiary amine as catalyst to produce an O,O-dihydrocarbyl S-bicyclo(2.2.1)-5-hepten-2-yl thiothionophosphate.

9. The process which comprises reacting O,O-diethyl dithiophosphoric acid and bicycloheptadiene in the presence of an aliphatic tertiary amine as catalyst to produce O,O-diethyl S-bicyclo(2.2.1)-5-hepten-2-yl thiothionophosphate.

References Cited in the file of this patent

UNITED STATES PATENTS

| 2,622,096 | Ladd | Dec. 16, 1952 |
| 2,665,295 | Augustine | Jan. 5, 1954 |
| 2,689,258 | McDermott | Sept. 14, 1954 |

FOREIGN PATENTS

| 714,509 | Great Britain | Sept. 1, 1954 |

OTHER REFERENCES

Organic Reactions, vol. IV, John Wiley & Sons (1948), pp. 64–65; 77–78. (Copy in Scientific Library and Div. 6.)